(12) United States Patent
Ulicny et al.

(10) Patent No.: US 6,490,549 B1
(45) Date of Patent: Dec. 3, 2002

(54) AUTOMATIC ORTHOGRAPHIC TRANSFORMATION OF A TEXT STREAM

(75) Inventors: Brian Ulicny, Winchester, MA (US); Alex Vasserman, Malden, MA (US); Paul Vozila, Arlington, MA (US); Jeffrey P. Adams, Tyngsboro, MA (US)

(73) Assignee: ScanSoft, Inc., Peabody, MA (US)

( * ) Notice: Subject to any disclaimer, the term of this patent is extended or adjusted under 35 U.S.C. 154(b) by 0 days.

(21) Appl. No.: 09/539,066

(22) Filed: Mar. 30, 2000

(51) Int. Cl.[7] .......................... G06F 17/21; G06F 15/00
(52) U.S. Cl. .......................... 704/10; 707/533
(58) Field of Search .......................... 704/1, 9, 10, 257, 704/534; 707/532, 533

(56) References Cited

U.S. PATENT DOCUMENTS

| | | | |
|---|---|---|---|
| 5,467,425 A | 11/1995 | Lau et al. ................... | 395/2.52 |
| 5,819,265 A | * 10/1998 | Ravin et al. ................... | 707/5 |
| 6,167,368 A | * 12/2000 | Wacholder ................... | 704/9 |

OTHER PUBLICATIONS

Reynar et al.; "A Maximum Entropy Approach to Identifying Sentence Boundaries", Proced. of the 5th Conf. on Applied Natural Language, 1997.*

Borthwick et al.; "Exploiting Diverse Knowledge Sources via Maximum Entropy in Named Entity Recognition" 1998.*

Berger, et al, "A Maximum Entropy Approach to Natural Language Processing", *Association for Computational Linguistics*, 1996, pp. 1–36.

Chen, et al, "A Gaussian Prior for Smoothing Maximum Entropy Models", Technical Report CMUCS–99–108, Carnegie Mellon University, 1999.

Della Pietra, Stephen, et al, "Inducing Features of Random Fields", *IEEE Transactions on Pattern Analysis and Machine Intelligence*, 1997, vol. 19, No. 4, pp. 380–393.

* cited by examiner

*Primary Examiner*—Patrick N. Edouard
(74) *Attorney, Agent, or Firm*—Bromberg & Sunstein LLP

(57) ABSTRACT

A method is given for automatically rewriting orthography of a stream of text words, for example, automatically and properly capitalizing words in the stream. If a word in the stream has an entry in an orthography rewrite lexicon, the word is automatically replaced with an orthographically rewritten form of the word from the orthography rewrite lexicon. In addition, selected words in the stream are compared to a plurality of features weighted by a maximum entropy-based algorithm, to automatically determine whether to rewrite orthography of any of the selected words.

8 Claims, 2 Drawing Sheets

AUTOMATIC ORTHOGRAPHIC TRANSFORMATION OF A TEXT STREAM

FIELD OF THE INVENTION

The invention generally relates to natural language processing, and more particularly, the automatic transformation of the orthography of a text stream such as the proper capitalization of words in a stream of text, especially with respect to automatic speech recognition.

BACKGROUND ART

Capitalized word forms in English can be divided into two main types: those that are determined by where the term occurs (or, positional capitalizations) and those that are determined by what the term denotes (or, denotational capitalizations). In English, positional capitalization occurs, for example, at the beginning of a sentence, or the beginning of quoted speech. Denotational capitalization is, to a first approximation, dependent upon whether the term or expression is a proper name.

Positional capitalization is straightforward; the rules governing positional capitalization are very clear. In the context of dictation and automatic speech recognition, sentence splitting is very accurate because the user must dictate the sentence-ending punctuation. By contrast, abbreviations and other phenomena make splitting written text into sentences a non-trivial task. In the context of dictation and automatic speech recognition, simple pattern matching allows one to do positional capitalization with near perfect accuracy.

Denotational capitalization is much harder to do automatically. Denotational capitalization can be viewed as the flip side of proper name recognition—an information extraction task for which the current state of the art reports about a 94% combined precision and recall over a restricted set of name types. In proper name recognition, the goal is to correctly determine which expressions refer to (the same) named entities in a text, using the words, their position and their capitalization. The goal is to use an expression and its context to determine if it is a proper name, and therefore, should be capitalized.

Existing speech recognition systems tend to make a large number of errors on capitalization—about 5–7% of dictated words, in English. Most of these errors are errors of denotational capitalization. The difficulty arises for terms which are both common nouns (or other uncapitalized words), and constituents of proper nouns, such as "Bill Gates" or "Black's Disease."

SUMMARY OF THE INVENTION

Throughout the following description and claims, the term 'tag' is used to denote the properties that annotate a word or word phrase, including part of speech information. The term 'feature' is used in the maximum-entropy sense to mean the co-occurrence of certain items or properties.

A representative embodiment of the present invention includes a method of automatically rewriting the orthography of a stream of text words. If a word in the stream has an entry in an orthography rewrite lexicon, the word is automatically replaced with an orthographically rewritten form of the word from the orthography rewrite lexicon. In addition, selected words in the stream are compared to a plurality of features weighted by a maximum entropy-based algorithm, to automatically determine whether to rewrite orthography of any of the selected words. Orthographic rewriting may include properly capitalizing and/or abbreviating words in the stream of text words.

In a further embodiment, the method also includes, if a series of adjacent words in the stream has an entry in a phrase rewrite lexicon, replacing the series of adjacent words with a phrase form of the series of words from the phrase rewrite lexicon. Annotating linguistic tags may be associated with the orthographically rewritten form of the word. The method may also include providing linguistic tags to selected words in the stream, using context-sensitive rewrite rules to change the orthography of words in the stream based on their linguistic tags, and weighting the application of these rules in specific contexts according to maximum entropy weighting.

At least one of the features may be a context-dependent probability distribution representing a likelihood of a given word in a given context being in a given orthographic form. In a further embodiment, for each selected word, determining an orthographic rewrite probability representing a normalized product of the weighted features for that word, and if the orthographic rewrite probability is greater than a selected threshold probability, replacing that selected word with an orthographically rewritten form.

BRIEF DESCRIPTION OF THE DRAWINGS

The present invention will be more readily understood by reference to the following detailed description taken with the accompanying drawings, in which.

DETAILED DESCRIPTION OF SPECIFIC EMBODIMENTS

Representative embodiments of the present invention use a maximum entropy approach to provide automatic orthographic transformation of a text stream. Although the following description is focussed on the specific case of proper automatic capitalization, the general approach is equally effective for other types of orthographic transformation such as abbreviations. For example, in an automatic speech recognition system, a user input of the spoken words "maple drive" would be automatically capitalized and abbreviated to "Maple Dr."

Maximum entropy modeling models all the information known about a system (the constraints), but is maximally uninformed (entropic) about what is unknown. As such, the maximum entropy model is the best possible model of the know ledge of the system: a model with less entropy adds information that is not justified empirically. A maximum entropy procedure assigns weights to various factors used for determining whether an element has a given property F. The combined weight of these factors determines a prediction as to whether any particular element is F or not. In this specific instance, the property is "is a word that should be capitalized".

Each word in a stream of text has associated with it a number of "tags" that are related to various descriptive properties of the word, and which correspond to the weighted features. Some of these tags relate to the intrinsic properties of the word such as what part of speech it has, whether it is a surname or a company name, how likely it is to be capitalized, and so on. Other tags indicate relational properties of the word, such as the likelihood of its being capitalized when following or preceding another particular word, or a word of a particular type, or the likelihood of the word being capitalized when following or preceding another capitalized word.

Experimental results indicate that a "hybrid" maximum entropy approach can yield capitalization accuracies of 98%. The system is a hybrid between a pure rule-based system and a purely statistical system because it uses a variety of features, including whether a word would be capitalized by one of several capitalization rules derived from the Chicago Manual of Style.

Figure 1:
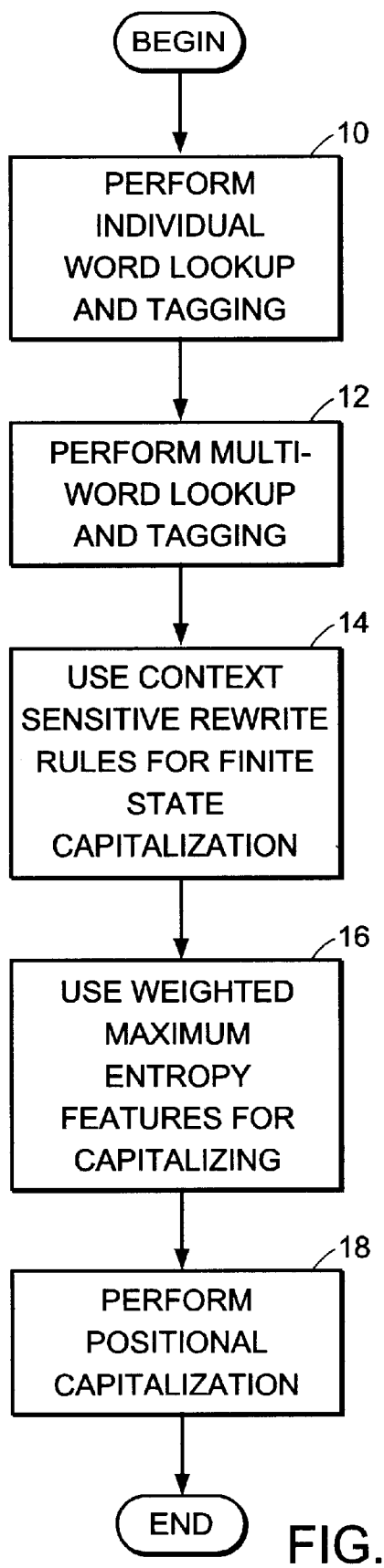
FIG. 1 illustrates the logical steps in the general approach of a representative embodiment.

As shown in FIG. 1, typical specific embodiments proceed in five general steps: word lookup/tagging 10, multiword lookup/tagging 12, finite state capitalization 14, maximum entropy capitalization 16, and positional capitalization 18. Each step will be described in turn.

In the individual word lookup/tagging 10, a recognized word is looked up in a capitalization lexicon. If the word appears in the capitalization lexicon, it is replaced with a tagged form of the word, retaining whatever capitalization is determined by the language model. Part of speech (POS) tags and semantic tags (e.g. "Microsoft" has the tag "Company") are appended to the term as well. The POS tags (based on the Brown corpus tagset) are in order of descending frequency for that term. No disambiguation in context need be done. Any word may, therefor, have more than one POS tag and semantic tag. After lookup, each term has the form:

Word\POS1__POS2 ... Tag1__Tag 2__ ... (e.g. Microsoft/NN__Company)

There are approximately 34.5K unique forms in the capitalization lexicon used in one embodiment of the invention. An initial subset corresponding to the active vocabulary could be selected. For words not in the lexicon, POS tagging may be done by prediction, using a suffix table (203 Kb).

In the multiword lookup/tagging 12 of the generic capitalization algorithm, multiword phrases (e.g. "Statue of Liberty") are looked up using a special multiword capitalization lexicon. The multiword capitalization lexicon may be keyed on the last element of a multiword expression ("Statue of Liberty"-> liberty), and may contain information about how many words back must be examined to verify the presence of the multiword expression. If the multiword expression is present, the individual normalized words are overwritten with the normalized forms and tags of the multiword expression. Multiword phrases have a tag appended of the form "MWnm", indicating that this word is the nth element of an m-word multiword. For example, "statue of liberty" would result in:

Statue\NN__StructureCoda__MW13 of\IN__Of__MW23 Liberty\NN__MW33

Multiword phrases are also useful for down-casing terms that are normally capitalized as in Brussels -> brussels sprouts.

There are approximately 26.5K unique multiword forms in the multiword capitalization lexicon used in one embodiment. Again, a subset corresponding more closely to the active vocabulary could be selected for initial use.

The finite state rule 14 of the generic capitalization algorithm uses context sensitive rewrite rules to change the language model-determined capitalization of strings based on their tags. For example, a rule:

Surname->Cap(Surname)/FirstName (Initial){0,2 }__ means "capitalize a word tagged with Surname if it follows a word tagged with FirstName and at most two Initials". While this rule is unnecessary if the normalized form of both the first name and surname are already capitalized, it is useful in cases of ambiguous names such as "Bill Gates", where at least one part is normally not capitalized. This rule has been found to be 99.6% accurate on Wall Street Journal corpora.

For one embodiment implemented in Perl, 204 rules derived from the Chicago Manual of Style and the Associated Press Style Guide, as well as corpus work, were implemented. Of these rules, only about half were triggered in the available corpora. Rules about musical compositions and chemical compounds, for example, had little impact in practice. Most of these rules involve checking for the presence of a term with a particular tag, (e.g. OrgCoda or "organization coda" such as "Association"), checking for a surrounding context of capitalizable words (nouns, adjectives, and so on), and checking for an appropriately definite determiner since proper names are definite noun phrases—compare "the Associated Press" with "an associated press" (but cf. "a metropolitan museum" vs. "a Metropolitan Museum exhibit"). For this part of the procedure, we have chosen to retain those rules that have been shown to be at least 90% accurate on a suitable corpus.

A tag denoting that a word was capitalized by a particular rule may be added to the tag set. For example, Museum/NN__StructureCoda__R101 encodes the fact that this word was capitalized by Rule 101. A word may be capitalized by more than one rule. This is represented by more than one R<N>tag.

The capitalization algorithm capitalizes only appropriate parts of speech; prepositions and conjunctions are not capitalized even if they fall between appropriate triggers. For example: the determiner, preposition and conjunction in the following are not capitalized:

The College of William and Mary

Words that are part of a sequence capitalized by a rule, but that aren't themselves capitalized, receive an 'r<N>' tag, where N is the rule number. More than one 'r<N>' tag may be appended to a word.

The maximum entropy capitalization 16 of the generic capitalization algorithm uses a series of features, weighted by the algorithm, to determine the capitalization of a sequence of words. These features represent empirically determined constraints on the distribution of capitalization in given contexts, determined by a training corpus. One specific embodiment uses an improved iterative scaling maximum entropy algorithm as described, for example, in Della Pietra et al., *Inducing Features of Random Fields*, IEEE Transactions on Pattern Analysis and Machine Intelligence, Vol. 19, No. 4, pp. 380–93, April 1997, the contents of which are hereby incorporated herein by reference.

In weighting the features, the expected distribution of capitalization in a set of specified contexts is based on a large training corpus that is processed offline. These features involve the presence of nearby punctuation, the identity and capitalization of the target words and its neighbors, the tags associated with the target word and its neighbors, and whether the current word was capitalized by a particular finite-state capitalization rule.

The maximum entropy capitalization 16 of representative embodiments involves two main stages. In the first stage, a word is assigned various tags indicating features that it has either intrinsically, or in a particular context (these include features indicating that a word would be capitalized by a particular finite-state capitalization rule). A feature weight may be defined for any tag, and unweighted tags have no effect on the decision whether to capitalize. In the second stage, the decision whether to capitalize a word is determined by the weights associated with the tags on a word. The threshold calculation finding the product of the feature weights, and dividing this product by the sum of itself with a generic probability of a word's being uncapitalized.

The general principle of representative embodiments can be illustrated by an example—suppose that the following sequence is recognized:

"it is recognized by the mine safety health administration, U.S. department of labor, as being intrinsically safe in methane mixtures."

Should the word 'safety' be capitalized? The answer is yes: the sentence should read:

"It is recognized by the Mine Safety Health Administration, U.S. Dept. of Labor, as being intrinsically safe in methane mixtures."

The maximum entropy capitalization 16 of a typical embodiment determines the weights associated with various facts about the word "safety," and then calculates a score on the basis of those weights. If the score is greater than 0.5, the word should be capitalized.

This sentence would be partially tagged via lookup and rule application as follows (in simplified form):

It\PPO__PPS is\BEZ recognized\VBN__VBD by\IN__RB__NN__LocPrep the\AT__NN__Def mine\NN__PP$$__VB__GeogCoda safety\NN__R107 health\NN__BizCoda__RetailCoda administration\NN__AdminCoda , \COMMA U.S. \NN__Country__Geog department\NN__AdminCoda__BizCoda__StructureCoda__PosMod of\IN__NN__Of labor\JJ__NN__VB__Secretariat, \COMMA . . .

Assuming that only Rule 107 (indicated by R107 ) applied to capitalize "safety" in "mine health safety administration" the capitalization of the word "safety" would be determined by the weights assigned to the various features the maximum entropy algorithm considered:

| Feature | Weight | |
|---|---|---|
| 1. generic cap-weight | 0.534 | any word capitalized |
| 2. generic uncap-weight | 1.321 | any word lowercase |
| 3. unigram "safety" | 0.650 | "safety" capitalization weight |
| 4. "mine" <cap> | 2.317 | "mine" predicts Cap |
| 5. <cap> "Health" | 3.138 | "Health" retrodicts Cap |
| 6. "mine safety" | 1.164 | only one bigram is present |
| 7. "NN NN" | 0.5 | noun preceded by noun capitalized |
| 8. "NN BizCoda" | 2.0 | noun-BizCoda bigrams capitalized |
| 9. "NN RetailCoda" | 2.0 | noun-RetailCoda bigrams capitalized |
| 10. "NN NN" | 0.5 | noun following noun capitalized |
| 11. "GeogCoda NN" | 0.25 | GeogCoda-noun bigrams capitalized |
| 12. Rule 107 | 4.0 | 'Safety' would be capped by Rule107 |

Accumulated Weight = W3 × . . . W12 = 5.501

$$\text{Cap Probability } P = \frac{(\text{cap-weight} * \text{Acc\_weight})}{(\text{uncap-weight} + \text{cap-weight} * \text{Acc\_weight})} = .690$$

Capitalize safety? = (P > .5) = yes

Capitalization of a particular word depends on both left and right context. In order to avoid the logical issues of what to change first, the algorithm may be run iteratively until changes stop propagating. However, experimentation has shown that three passes are usually enough. If the capitalization of its neighboring words changes, the score of a word must be (partially) recalculated to reflect the change.

Positional capitalization 18, may be done by an Inverse Text Normalization (ITN) component of a speech application programming interface (SAPI). The beginning of sentences and quotations and other positions where capitalization should take place may be done by simple pattern matching there.

Figure 2:
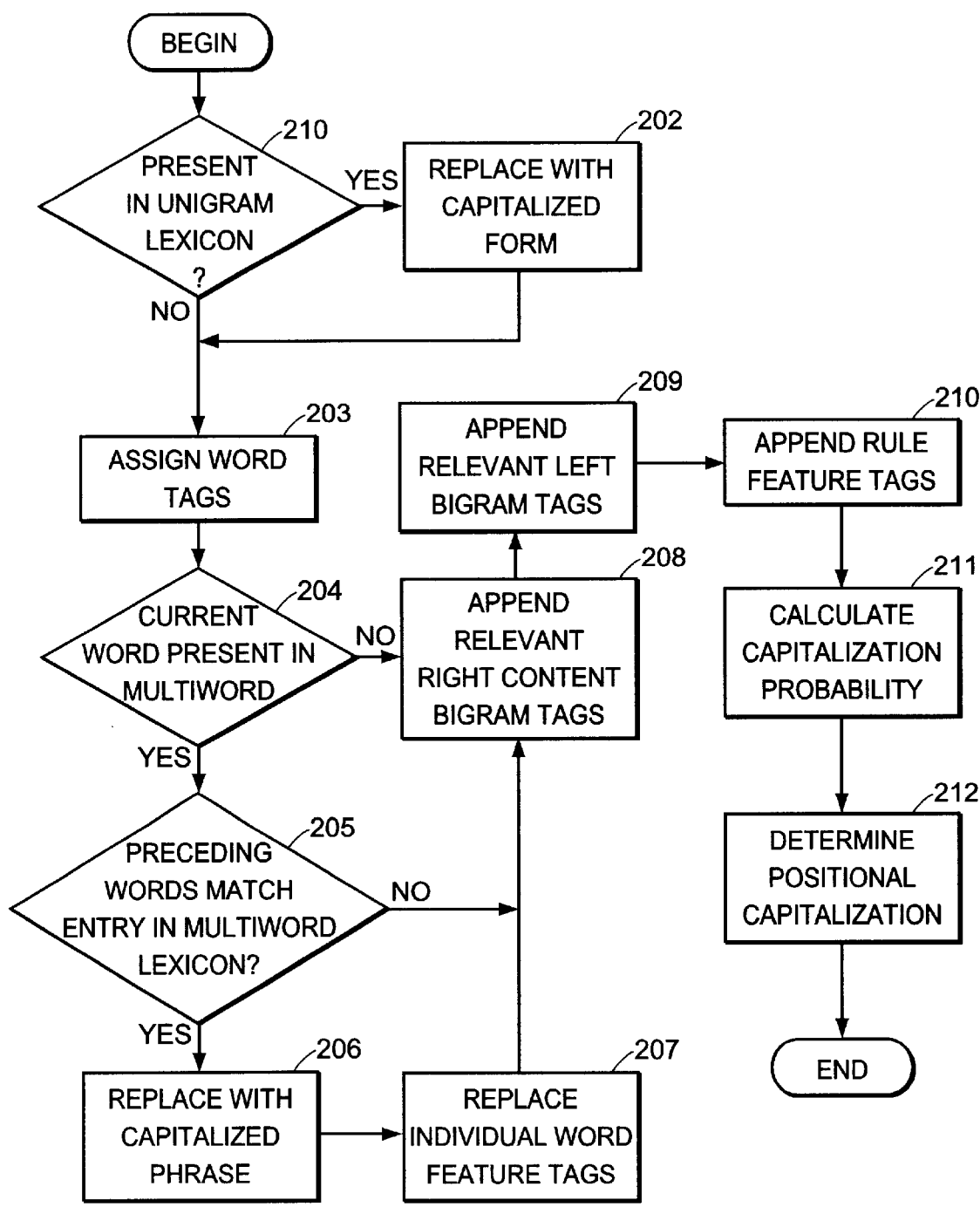
FIG. 2 illustrates the logical steps in one specific embodiment.

Specific details of one particular embodiment will now be described. This particular approach may be viewed as having a feature assignment phase and a scoring phase. The feature assignment starts with a capitalization buffer of three pause-delimited utterances, or 15 dictated words from an automatic speech recognizer, whichever is longer. The recognized words will not have any attached non-intrinsic punctuation (which is done later), so no additional separation of word tokens is needed. For each new word in the capitalization buffer, a four-step feature assigment is performed:

Step (1): Do unigram lookups. A unigram capitalization lexicon contains words as keys, and assigns various tags to those words. These features include part of speech (POS) tags, semantic tags (e.g. Surname, Company), the frequency and probability of this word being capitalized, and the frequency and probability of being capitalized after and before a capitalized word. If the unigram capitalization lexicon contains a lowercase version of the word as a key, step 201 in FIG. 2, the lowercase version of the word is replaced by a capitalized form of the word from the lexicon, 202, and appropriate tags are appended to the word 203. On the other hand, if in step 201 the unigram capitalization lexicon does not contain a lowercase of the word as a key, POS tags may be predicted on the basis of the word ending from a suffix list, and the POS tags may then be appended to the word in step 203.

An example of unigram tagging would be:

apple ->apple/NN__Company__CapFreqProb08__CappedFollowingCap13

Step (2): Do multiword lookup. A multiword capitalization lexicon contains a list of the last word of various multiword phrases as its keys. For each key, there is an integer indicating how many words back the phrase begins, the complete phrase, and a set of features for each word of the phrase. For each word, if the multiword capitalization lexicon contains the word or tag as a key, step 204, a check is made to see if the associated preceding words or tags are also present in the capitalization buffer, step 205. If so, the words are replaced by the capitalized form of the phrase from the multi-word lexicon 206 and the previous feature tags for the words in the phrase are replaced with those phrase tags indicated in the lexicon for each word 207. An example of multiword lookup would be:

statue/A of/B liberty/C ->Statue/E of/F Liberty/G

Step (3): Do content bigram lookups. A Right Content Bigram Lexicon contains a list of the right word or tag of a bigram as its keys. For each key, there is a flag determining whether to skip over stop words, the left word or tag of the bigram (which may be a wildcard indicating any word), and the features to assign to the right and left member of the bigram, step 208. The features to assign may include features indicating the frequency and probability of capitalizing the right member of the bigram if preceded by the left content word, a feature indicating the frequency and probability of capitalizing the left member of the bigram if followed by the right content word or tag, a feature indicating the frequency and probability of capitalizing the left member of the bigram if the right word is capitalized, (PredictPrevCapifCapped), and a feature indicating the fre quency and probability of capitalizing the left member of the bigram if the right word is lowercase (PredictPrevCapifLC).

Similarly, a Left Content Bigram Lexicon contains a list of the left word or tag of a bigram as its keys. For each key, there is a flag determining whether to skip over stopwords, the right member of the bigram (which may be a wildcard indicating any word), and the features to assign to the right and left member of the bigram, step 209. The features to assign may include a feature indicating the frequency and probability of capitalizing the right member of the bigram if the right word is capitalized (PredictNextCapifCapped), and a feature indicating the frequency and probability of capitalizing the right member of the bigram if the left word is lowercase (PredictPrevCapifLC). An example of a content bigram lookup would be:

Lexicon contains:
  Right Bigram Key: bar
  Skip StopWords: yes
  Left element: foo
  Features to assign:
    Left: H
    Right: I
  Foo/A_B_C of the bar/D_E_F->
    Foo/A_B_C_H of the bar/D_E_F_I Step (4): Assign rule features. A rule list includes a numbered list of regular expressions, expressed in terms of words and tags. The regular expression contains a (possibly empty) left context, a (possibly empty) right context, and a target. If the entire expression (left context, target, and right context) is matched in the buffer, a rule feature tag is attached 210 to each word in the target in the following way:

If the target word is capitalizable (noun, adjective, participle, etc), attach R<rule number>.

If the target word is not capitalizable (preposition, verb, etc), attach r<rule number>.

This part of the system could be compiled as a finite state transducer. For example:

Rule 100: (left: Preposition)(target: Company)(right: nil)
  for/Preposition apple/NN_Company ->
    for/Preposition apple/NN_Company_R100

The scoring phase of a specific embodiment calculates the capitalization score 211 of any word in the buffer:

Initial value of Score=the general probability of any word whatsoever being capitalized For each feature (except those indicated below):
  If weight(feature) is defined,
    Score=Score * weight(feature)
Repeat 3 times:
  Determine whether the next (content) word is capitalized (NextCapped=1 or 0) and whether the previous content word is capitalized (PrecedingCapped=1 or 0).
  For the features:
    CapFollowsCap,
    PredictsNextWordifCapped,
    PredictsNextWordifLC
      ScoreinContext=Score* (PrecedingCapped * weight (feature))
  For the features:
    CapBeforeCap,
    PredictsPrevWordifCapped
    PredictsPrevWordifLC
      ScoreinContext=Score * (NextCapped * weight (feature))

After three passes of scoring in context:
For each word in buffer, compute CapProbability $$CapProbability(word) = \frac{ScoreinContext(word)}{(ScoreinContext(word) + GenericLowerCaseProbability)}$$

If CapProbability(word)>Threshold,
  Capitalize first letter of word in buffer.

Based on this calculation, corresponding words in the recognition window are replaced with the contents of the capitalization buffer after having removed the tags from the words.

As stated previously, positional capitalization may be done 212 by an Inverse Text Normalization (ITN) component of a speech application programming interface (SAPI).

One specific embodiment is designed to have a separation of data from machinery. As a result, to repurpose this capitalization engine for another language requires only a different set of data files for the new language. In one alternative embodiment trigrams, or other n-grams may be used in addition to or in lieu of bigrams, and this would involve some changes to the procedure described above. In practice, however, the run-time data for n-grams>2 would almost certainly be much larger and create a system performance penalty.

In one advanced embodiment, the capitalization module is reusable. In many embodiments, the most application-specific aspect is the assignment of tags to words, and the system needs to be told to assign tags to words in a variety of ways. In the advanced embodiment contemplated, these tag assignment methods are the parameters of a generic feature assignment method. That is, a set of feature assignment data files is indicated, and these files specify the procedure by which they attach tags to elements. For example, a unigram lexicon may specify that its features are to be assigned to the keys themselves. Another data file may specify that for each key, the tags associated with the key are to be assigned to the second element to the left of the present element. A third data file may specify that it was a regular expression file, and its features were to be assigned to the target elements that matched its regular expressions. And so on.

Tracking the capitalization score of a word may involve redundant or unnecessary processing. If a word is known to be never capitalized, an associated tag will have a zero weight; checking whether a word's score is zero will eliminate unnecessary calculations. Similarly, there may also be a way to avoid unnecessary score calculations for words that are certain to be capitalized (whose score is so high that capitalization is guaranteed).

Although various exemplary embodiments of the invention have been disclosed, it should be apparent to those skilled in the art that various changes and modifications can be made which will achieve some of the advantages of the invention without departing from the true scope of the invention.

DEFINITIONS

Capitalized: means "has an initial uppercase letter". Therefore, Apple, APPLE, and AppLE are all capitalized, but apple (and aPPLE) are not capitalized.
Unigram: a word itself
Bigram: a two-word sequence
Content Bigram: a sequence of two words, possibly with an intervening sequence of stop words.
Stop Word: a member of a set of specified function words such as "of", "the", "for", and so on.

POS Tags: Part of Speech Tags. In one specific embodiment, the Brown tagset was used.

What is claimed is:

1. A method of automatically rewriting orthography of a stream of text words comprising:

if a word in the stream has an entry in an orthography rewrite lexicon, automatically replacing the word with an orthographically rewritten form of the word from the orthography rewrite lexicon;

selecting words in the stream; and comparing the selected words to a plurality of features weighted by a maximum entropy-based algorithm, to automatically determine whether to rewrite orthography of any of the selected words.

2. A method according to claim 1, further comprising:

if a series of adjacent words in the stream has an entry in a phrase rewrite lexicon, replacing the series of adjacent words with a phrase form of the series of words from the phrase rewrite lexicon.

3. A method according to claim 1, wherein automatically replacing the word includes associating annotating linguistic tags with the orthographically rewritten form of the word.

4. A method according to claim 1, further comprising:

providing linguistic tags to selected words in the stream;

using context-sensitive rewrite rules to change the orthography of words in the stream based on their linguistic tags; and weighting the application of these rules in specific contexts according to maximum entropy weighting.

5. A method according to claim 1, wherein at least one of the features is a context-dependent probability distribution representing a likelihood of a given word in a given context being in a given orthographic form.

6. A method according to claim 5, further comprising:

for each selected word, determining an orthographic rewrite probability representing a normalized product of the weighted features for that word, and if the orthographic rewrite probability is greater than a selected threshold probability, replacing that selected word with an orthographically rewritten form.

7. A method according to claim 1, wherein the method automatically capitalizes words in the stream of text words.

8. A method according to claim 1, wherein the method automatically abbreviates words in the stream of text words.

\* \* \* \* \*